United States Patent [19]

Dieterich

[11] Patent Number: 4,787,056

[45] Date of Patent: Nov. 22, 1988

[54] APPARATUS FOR ESTIMATING THE SQUARE OF DIGITAL SAMPLES

[75] Inventor: Charles B. Dieterich, South Brunswick Township, Middlesex County, N.J.

[73] Assignee: RCA Licensing Corporation, Princeton, N.J.

[21] Appl. No.: 844,203

[22] Filed: Mar. 26, 1986

[51] Int. Cl.[4] .................................................. G06F 7/38
[52] U.S. Cl. ................................................... 364/753
[58] Field of Search ........................ 364/753, 754, 757

[56] References Cited

U.S. PATENT DOCUMENTS

| | | | |
|---|---|---|---|
| 3,749,898 | 7/1973 | Logan | 364/757 |
| 4,158,889 | 6/1979 | Monden | 364/753 |
| 4,598,382 | 6/1986 | Sato | 364/757 |

FOREIGN PATENT DOCUMENTS 0736095  5/1980  U.S.S.R. .............................. 364/753

OTHER PUBLICATIONS

Oberman, *Digital Circuits for Binary Arithmetic*, John Wiley & Sons, New York, pp. 169–177, 1979.
Leslie B. Tyler et al, A Companding System for Multi-channel TV Sound, IEEE Trans., On Consumer Electronics, vol. CE-30, No. 4, 11/84, pp. 633–640.
Office of Science and Technology, Bulletin No. 60.
V. Cappellini et al, Digital Filters and Their Application, Academic Press, New York, 1978, pp. 243–245.

*Primary Examiner*—Gary V. Harkcom
*Assistant Examiner*—Dale M. Shaw
*Attorney, Agent, or Firm*—Eugene M. Whitacre; Paul J. Rasmussen; Eric P. Herrmann

[57] ABSTRACT

Apparatus for estimating the square of a multi-bit digital sample having a value (A+B) segments the sample into a most significantf bit (MSB) portion having the value A, and a least significant bit (LSB) portion having a value B. The LSB portion is added back to the sample to produce a sample having a value of (A+2B), which sample is applied to the multiplicand input of a multiplier circuit. The MSB portion of the sample is coupled to the multiplier input of the multiplier circuit which produces the product ($A^2$+2AB) as an estimate of the square of the sample. Estimating the square in this manner significantly reduces the size of the multiplier circuit.

11 Claims, 4 Drawing Sheets

APPARATUS FOR ESTIMATING THE SQUARE OF DIGITAL SAMPLES

This invention relates to circuitry for estimating the square of a value represented by binary samples.

Recent developments in very-large-scale-integrated-circuits have made practical real time digital processing of various types of signals that have heretofore been processed with analog circuitry. For example, ITT INTERMETALL INDUSTRIES, Freiburg, W. Germany, has developed the DIGIT 2000 series of circuits for digitally processing baseband video and audio signals in television receivers. The impetus for converting to digital signal processing arises from potential cost savings, inclusion of features which cannot be effectively realized with conventional analog components, and the inherent parametric stability of digital circuits.

Digital processing may be performed with signals formatted as parallel-bit samples or serial-bit samples. There is a basic speed-complexity trade-off between selecting parallel-bit or serial-bit processing. Parallel-bit circuits in general are required for processing wide-band signals but are relatively complex. Serial-bit circuits are relatively simple but are relegated to narrower band-width signals. For the current state of the art of digital processing, parallel-bit circuitry is required to process video signals in a TV receiver, however, the audio signals may be processed in serial-bit format. For purposes of illustration, the invention will be described in the environment of a portion of a digital audio processing circuit of a TV receiver capable of producing stereo sound. It is to be understood, however, that the invention is not limited to audio processing.

In a stereo-sound TV receiver the broadcast sound signal is a composite signal including a (L+R) or monaural signal and a (L−R) stereo component signal. The broadcast (L−R) component is compressed to enhance its signal-to-noise ratio and therefore must be expanded in the receiver to properly reproduce the original sound signals.

The system currently utilized in the United States was selected by the Electronic Industries Association (EIA) under the auspices of its Broadcast Television Systems Committee (BTSC). The parameters of the system are documented by the Office of Science and Technology in the OST Bulletin No. 60. A general system description may be found in an article by Leslie B. Tyler et al. entitled "A Companding System For Multichannel TV Sound", IEEE Transactions on Consumer Electronics, Vol. CE-30, No. 4, November 1984, p. 633-640.

The BTSC system performs companding on the stereo audio difference (L−R) signal, and the secondary audio signals. The companding involves spectral compression/expansion and wide-band amplitude compression/expansion. Signal compression and expansion are complementary functions. Compression is performed by a process of detecting the RMS value of the signal and limiting the frequency response and amplitude of the compressed signal as a function of the RMS value prior to broadcasting. Expansion on the other hand involves detecting the RMS value of the received compressed signal and emphasizing and amplifying the compressed signal as a function of the detected RMS value to substantially restore the signal to its original form.

From the foregoing, it is apparent that the receiver must include an RMS detector. A straight-forward RMS detector, for processing sampled data or digital signals, includes apparatus to square the samples representing the compressed signal, to average the squared samples over time, and to take the square root of the averaged values.

The object of this invention is apparatus for performing the squaring function with a minimum of hardware. Digital sound signals are typically represented in digital format with samples having relatively wide bit-width. For example, analog sound samples are digitized to 14-16 bit samples. Arithmetically processing the samples will tend to increase the number of bits per sample as the respective samples course through the processing system. The process of separating the (L−R) component from the composite sound signal, and demodulating the separated (L−R) component may extend the bit-width of this signal component to, for example, 20 bits. Squaring a 20-bit sample, as part of the RMS detection function, produces 40-bit samples. However, it is generally not necessary to define parameters within the RMS circuit with 40-bit resolution, at least not for generating the expander control signal. This permits of estimating the squared values with circuitry of lesser complexity than conventional 20-bit input squaring circuits.

In accordance with the present invention, the square of a value represented by an N-bit binary number is estimated by separating the N-bit numbers into L least significant bits (LSB's) and (N−L) most significant bits (MSB's). The value of the L LSB's is designated B and the value of the (N−L) MSB's is designated A. The value of the N-bit number may be represented by (A+B). The square of respective N-bit binary numbers is $$(A+B)^2 = A^2 + 2AB + B^2. \quad (1)$$

A first approximation of the square of the respective numbers may be generated simply by squaring the (N−L) MSB's resulting in the values represented by $A^2$. The error produced by this approximation is equal to $2AB + B^2$ and in general is unacceptable. In accordance with one aspect of the invention, a better approximation results from multiplying the (N−L) MSB's of the respective numbers by the entire numbers, thus $$A \cdot (A+B) = A^2 + AB \quad (2)$$

wherein the error is only $AB + B^2$. The term AB is always larger than $B^2$ except when A is zero. The value AB has a range up to $2^{L-N+1}$ and $B^2$ is always less than $2^{2(L-N+1)}$ (assuming the input samples are in two's complement format and have a range from positive one to negative one).

In accordance with another aspect of the invention, the error associated with the term AB can be eliminated by doubling the N-bit number, subtracting the (N−L) MSB's from the doubled number and multiplying the result by A. In algebraic terms, this may be represented $$A \cdot (2(A+B) - A) = A^2 + 2AB. \quad (3)$$

The error of this estimate relative to the actual square of (A+B) is thus only $B^2$. An error of this magnitude is in general acceptable for use in many processing functions.

Squaring binary or two's complement numbers involves multiplying the number by itself. Digital multiplication is performed by successively adding the number to shifted replications of itself. Serial-parallel multipliers include one adder for each bit position of the multiplier, see V. Cappellini et al., *Digital Filters And Their Application*, Academic Press, New York, 1978, pp. 243-245. A serial-parallel multiplier for squaring an N-bit number will incorporate N adders. Typical N-bit×N-bit matrix type parallel-bit multipliers incorporate N times N adder circuits. Thus, a conventional parallel-bit multiplier for squaring an N-bit number requires $N^2$ adders. In accordance with a feature of the invention, if the square is estimated by the foregoing algorithms, the multipliers may be reduced to N by (N−L) bit multipliers. This results in a savings of L adders in the serial-parallel multiplier and a savings of N times L adders in the parallel-bit multiplier.

SUMMARY OF THE INVENTION

This invention consists of apparatus for estimating the square of an N-bit binary number. It includes circuitry for segmenting the N-bit binary number into a first group of L-LSB's and a second group of the remaining M-MSB's. The N-bit number or a function thereof is coupled to the multiplicand input port of a digital multiplier and the M-MSB's of the number are coupled to the multiplier input port of the digital multiplier which produces the estimate of the square of the N-bit number.

DETAILED DESCRIPTION

Figure 1:
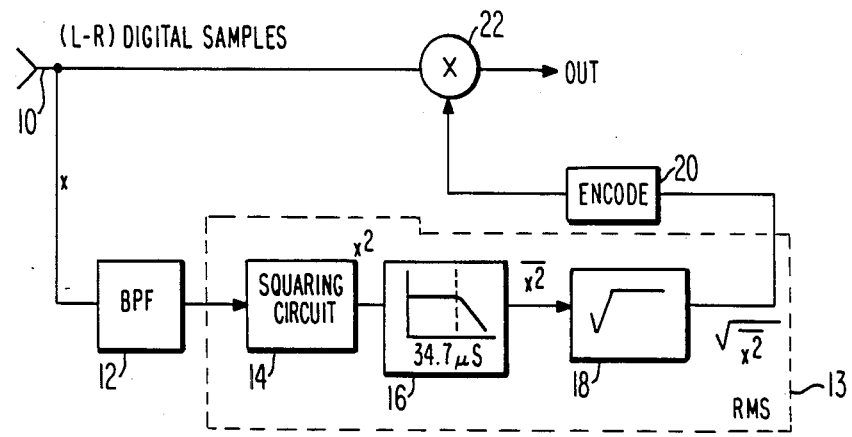
FIG. 1 is a block diagram of circuitry for expanding a compressed audio signal component in a multichannel sound TV receiver wherein the invention may be utilized.

FIG. 1 illustrates circuitry which may be utilized in a multichannel TV sound television receiver for performing wide-band expansion of the audio stereo difference signal. The stereo difference (L−R) signal, which may be derived from a synchronous AM demodulator (not shown) and assumed to be in digital sampled data format, is applied to input terminal 10. This signal is coupled to the multiplicand input of a multiplier 22 and to the input terminal of a band-pass filter 12. Band-pass filter 12, which may be a transversal filter, has lower and upper roll-off frequencies of 35 Hz and 2.1 kHz respectively, to limit the energy sensed by the RMS detector to the dominant energy in most program material. The signal provided by band-pass filter 12 is coupled to the RMS detector 13 including the cascade connection of a squaring circuit, 14, an averaging circuit, 16, and a square root circuit, 18. The RMS value of the band-pass filtered signal is coupled to an encoder 20 which conditions the RMS value for application as a multiplier input to multiplier 22. Encoder 20 may serve different functions depending upon, for example, the design of the particular multiplier 22. If the audio signal is in parallel-bit digital format and the multiplier 22 is a shift-and-add type multiplier, then circuit 20 converts the RMS values to multiplier shift control signals corresponding to multiplier signals. Alternatively, for example, the audio signal is in serial-bit digital format and multiplier 22 is a serial-parallel multiplier, element 20 may simply be a serial-to-parallel converter to translate a serial-bit RMS multiplier sample to a parallel-bit multiplier sample.

Squaring circuit 14 squares the signal applied from the band-pass filter 12. In the expander, the squared signal need not be defined with high precision. The squares of the samples may in fact be estimated by circuitry to be described below with reference to FIGS. 2-6.

Averaging circuit 16 is typically realized with a low-pass filter. The weighting interval recommended in the OST Bulletin No. 60 is approximately 35 msec. and may be realized with a recursive type filter to minimize storage elements.

The square root circuit 18 may be, for signals in digital format, a read-only-memory (ROM). Such a ROM would be programmed at each address location with the square root of the respective address value. The signal for which the square root is to be determined is coupled as address codewords to the address input port of the ROM and the data output by the ROM corresponds to the square root thereof.

Figure 2:
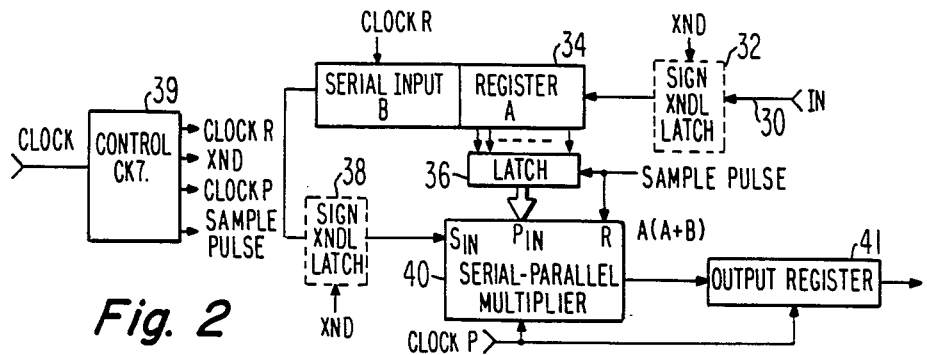
FIGS. 2-4 are partial-block, partial-logic schematic diagrams of alternative apparatus embodying the invention, which may be utilized in the FIG. 1 expander circuitry for providing estimates of the squares of serial-bit digital values.
Figure 3:
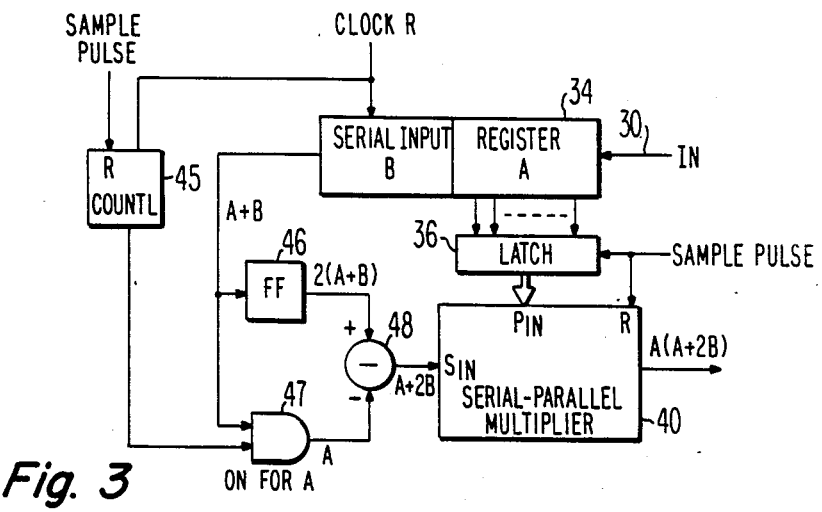
Figure 4:
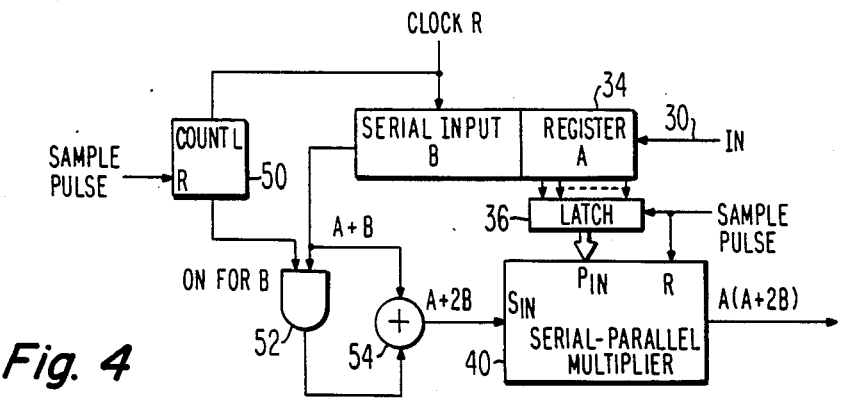

FIGS. 2-4 illustrate three embodiments of serial-bit digital circuitry for estimating the square of sample values which may be implemented for squaring circuit 14 in FIG. 1 in a serial-bit digital audio signal processing arrangement. In FIGS. 2-4 circuit elements designated with like numerals are similar and perform like functions. In each of the FIGS. 2-4 embodiments, the samples to be processed are segmented into an MSB portion having value A and an LSB portion having value B, with the value of respective samples corresponding to A+B. The FIG. 2 embodiment produces the value $A^2+AB$ as the estimate of the square of A+B. The FIGS. 3 and 4 embodiments produce the values $A^2+2AB$ as the estimate of the square of respective sample values A+B. The operation of the FIGS. 2-4 embodiments will be described with the aid of the waveforms illustrated in FIG. 5.

Figure 5:
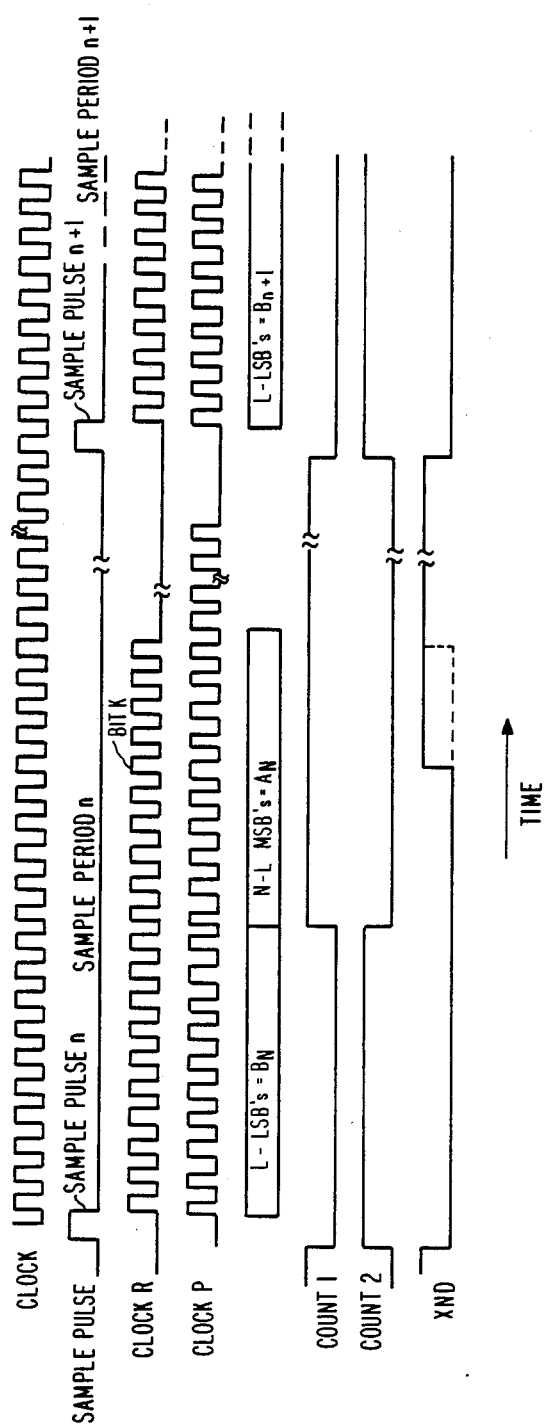
FIG. 5 is a waveform diagram of clock and control signal waveforms useful in describing serial-bit processing apparatus for estimating the squares of binary values.

In FIG. 5, time elapses from left to right. The topmost waveform, CLOCK, is the bit-rate clock and defines the occurrence of respective bits of the serial samples. The waveform designated SAMPLE PULSE defines the sample period of each sample with one serial sample occurring between each pair of sample pulses. Note that there may be S pulses of the signal CLOCK between each pair of pulses of the SAMPLE PULSE waveform but the number of bits per serial sample may only be N which is less than S. Thus, it may only be necessary to clock the serial-bit processing elements with a clock having bursts of N pulses. Such a clock signal is indicated as CLOCK R in FIG. 5. A multiplier, which multiplies an N-bit sample by an (N−L)-bit multiplier, produces a product having N+(N−L) sample bits or 2N−L bits. Thus, a serial-parallel multiplier must be clocked with 2N−L clock pulses to produce the result. This clock waveform is illustrated as CLOCK P in FIG. 5. Exemplary values for the frequencies of the signals SAMPLE PULSE and CLOCK are 300 KHz and 9.6 MHz.

In the illustrated examples, the serial-bit samples are assumed to occur bit-seriatum with the LSB first and the MSB last. The samples are also assumed to be in two's complement format, in which case the most significant sample bit is the sign bit (logic one for negative sample values and logic zero for positive sample values).

Referring to FIG. 2, the samples for which the square of their values are to be estimated are applied to connection 30. These samples are coupled to a shift register 34. During sample period n, sample n is loaded into register 34, under the control of CLOCK R, LSB first and MSB last. At the end of the burst of CLOCK R pulses, the L−LSB's are resident in the register section designated B and the (N−L) MSB's are resident in the register section designated A. The A section of register is provided with parallel output taps for each of the (N−L) MSB's. These taps are coupled to an (N−L) parallel bit latch 36. Latch 36 has a parallel-bit output port coupled to the parallel-bit multiplier input port, $P_{IN}$, of the serial-parallel multiplier circuit 40. On the occurrence of the n+1st sample pulse, the (N−L) MSB's of sample n, resident in section A of register 34, are replicated and stored for the duration of the n+1st sample period in latch 36, and are therefore present at the parallel input port of the multiplier 40 during the (n+1)st sample period.

During the burst of CLOCK R pulses in sample period n+1, the samples in register 34 are clocked seriatum into the serial multiplicand input port, $S_{IN}$, of multiplier 40. Multiplier 40, clocked by CLOCK P performs the multiplication of the serial-bit sample applied to its serial input by the parallel bit sample applied to its parallel input. The product is output from multiplier 40 bit seriatum and loaded into register 41. As indicated previously, the product is a (2N−L)-bit sample. If it is desired to truncate the product to an N-bit sample, register 41 will be provided with N stages and be clocked by CLOCK P. In this instance, the (N−L)-LSB's of the product are clocked through register 41 and lost. The N-MSB's of the product will be resident in register 41 at the termination of the sample period and properly justified for subsequent processing during the next sample period.

In the arrangement in FIG. 2, the (N−L)-MSB's (having value A) of each sample are applied to the parallel input port of the serial-parallel multiplier. All of the sample bits, corresponding to values (A+B), are applied to the serial input port of the multiplier. The product is therefore A(A+B) or $A^2+AB$ which is an estimate of the square of the sample value.

Several comments are in order at this point. First, the serial-parallel multiplier may have to be reset at the beginning of each sample period and this may be accomplished by application of the signal SAMPLE PULSE. Secondly, since the samples are presumed to be in two's complement format and since the number of bits in the serial-bit samples applied to the serial input of the multiplier are less in number than the number of clock pulses (CLOCK P) applied to the multiplier, it may be necessary to replicate the sign bit of the serial-bit sample, over the interval spanned by the additional number of clock pulses. This may be accomplished by interposing a transparent latch (38) between register 34 and multiplier 40. Latch 38 may be of the type designated SN74S373 and available from Texas Instruments Inc., Dallas Tx. Latch 38 controlled by the signal XND passes the (N−1)-LSB's output from register 34 but latches and stores the MSB for the duration of the sample period. The signal controlling latch 38 is illustrated as waveform XND in FIG. 5. The assumption here is that register 34 is an R-bit register and signal XND changes state at the Rth clock pulse indicated by the broken line version of signal XND. A third consideration is that register 34 may be an R-bit register and the input sample applied to connection 30 may be a K-bit sample (K<R). In this instance it becomes necessary to replicate the sign bit of the input sample in the (R−K)-MSB positions of register 34. This may be accomplished by inserting a transparent latch 32 between the input connection 30 and the input register 34. In this instance latch 32 must be conditioned to latch and store bit K (the MSB) of the input sample, and this is illustrated by the solid line representation of signal XND in FIG. 5. The clocks required to control the circuitry are developed from a system clock in element 39. From the waveforms depicted in FIG. 5, one skilled in the art of digital signal processing will readily be able to assemble circuitry to develop the requisite clock and control signals.

The apparatus illustrated in FIG. 3 operates similarly to the FIG. 2 apparatus except the values of the samples applied to the serial input of the multiplier are (A+2B) rather than (A+B). This is accomplished by delaying the samples provided from register 34 by one sample bit time in flip-flop 46 to effect a left shift of one bit significance relative to the system timing datum. A one significant bit left shift performs a multiplication or scaling by two. The scaled sample value 2(A+B) provided by flip-flop 46, is coupled to the minuend input of a subtracter circuit 48, the output of which is coupled to the serial input port of multiplier 40. The undelayed output from register 34 is coupled to the subtrahend input of subtracter circuit 48 through an AND gate 47. AND gate 47 is disabled during the L initial pulses of clock R so that the sample bits, corresponding to the values 2B are coupled to the multiplier. During the N−L later clock pulses of CLOCK R, when the (N−L)-MSB's of the sample (corresponding to value A) are output from register 34, AND gate 47 is enabled and the value A is subtracted from the value 2A provided by flip-flop 47. During this portion of the sample interval, the value A is coupled to the serial input of the multiplier. Over the entire clock burst, the value A+2B is coupled to the serial input of the multiplier and the multiplier produces the product A(A+2B) or $A^2+2AB$ which is an estimate of the square of (A+B).

The signal to enable AND gate 47 is illustrated as waveform, COUNT 1, in FIG. 5, and may be generated by counting L pulses of CLOCK R. Circuitry to perform the count is illustrated in FIG. 3 as courter 45, which counter is reset eaoh sample period by the signal SAMPLE PULSE.

The error in the estimate of the square produced by the FIG. 3 circuitry is $B^2$. This error may be reduced, an average, by adding a constant value to the estimate output from the multiplier. The value of the constant may be selected, for example, to be equal to one-third of the square of the maximum value that can be represented by the L-LSB's of the N-bit sample for which the square is estimated. In this instance the additive constant is $B_{MAX}^2/3$.

The apparatus of FIG. 4 produces the same result as the FIG. 3 apparatus, but with slightly different circuitry. In FIG. 4, the output of register 34 is coupled to one input of an adder 54 and also coupled to a second input of adder 54 through an AND gate 52. AND gate 52 is enabled for the first L-bits output by register 34 and during this interval adder 54 develops values corresponding to 2B. During the N−L MSB's of each sample output by register 34, AND gate 52 is disabled and adder 54 produces values corresponding to A. The output samples are coupled to the serial input of multiplier 40, which samples have values corresponding to (A+2B). The product produced by multiplier 40 in this instance is $A^2+2AB$.

The FIGS. 3 and 4 apparatus for estimating the squares of serial-bit samples may require sign bit replicating latches similar to the FIG. 2 circuit and may also require output registers similar to register 41. All of the comments made with regard to the FIG. 2 circuit in these respects apply to the FIGS. 3 and 4 circuits.

Figure 6:
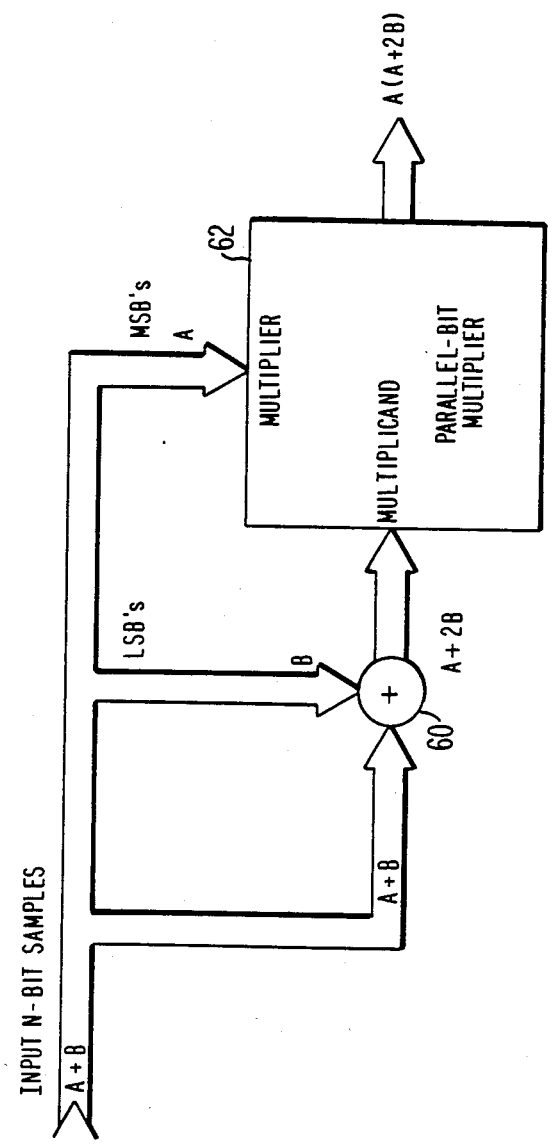
FIG. 6 is a block diagram of apparatus embodying the invention, for estimating the squares of numbers represented by parallel-bit binary samples.

FIG. 6 illustrates an embodiment for estimating the square of parallel-bit samples. In FIG. 6, all bits of the parallel bit samples (corresponding to values A+B) are coupled to a first input of an adder 60. The L-LSB's of the samples (corresponding to values, B) are coupled to a second input of the adder 60. Adder 60 produces samples of value (A+2B) which are coupled to the multiplicand input port of a parallel-bit multiplier 62. The (N−L) MSB's of the samples (corresponding to values A) are coupled to the multiplier input port of multiplier 62 which produces parallel-bit samples having values corresponding to $A^2+2AB$. Here again the error in the estimate may be reduced on average, by adding a constant value such as $B_{MAX}^2/3$ to the estimate.

What is claimed is:

1. Apparatus for producing an estimate of the square of a number represented by a multi-bit digital serial-bit sample wherein said multi-bit digital sample comprises N-bits including L least significant bits (LSB's) and (N−L) most significant bits (MSB's) where N and L are intergers, said apparatus comprising:
   an input terminal for receiving said multi-bit digital sample;
   a multiplier circuit having a parallel bit multiplier input terminal and a serial multiplicand input terminal, and having an output terminal for providing said estimate;
   a serial shift register having an input coupled to said input terminal for receiving said multi-bit digital sample, having a serial output terminal, and having (N−L) parallel output terminals for providing said (N−L)-MSB's;
   means for coupling said serial output terminal to said serial multiplicand input terminal;
   means for coupling said (N−L) parallel output terminals to said parallel bit multiplier input terminal.

2. Apparatus for producing an estimate of the square of a number represented by a multi-bit digital sample wherein said multi-bit digital sample comprises N-bits representing values (A+B) including L least significant bits (LSB's) representing value B and (N−L) most significant bits (MSB's) representing value A where N and L are integers, said apparatus comprising:
   an input terminal for receiving said multi-bit digital sample;
   a multiplier circuit having multiplier and multiplicand input terminals, and having an output terminal for providing said estimate;
   means coupled to said input terminal for applying said (N−L)-MSB's to said multiplier input terminal;
   means coupled to said input terminal for providing said L-LSB's of said multi-bit digital sample;
   an adder having a first input terminal coupled to said means for providing said L-LSB's, having a second input terminal, and having an output terminal coupled to said multiplicand input terminal;
   means, coupled to said input terminal, for applying said N-bit multi-bit digital sample to the second input terminal of said adder; and
   wherein the estimate of the square of the value (A+B) corresponds to $A^2+2AB$.

3. The apparatus set forth in claim 2 wherein said multi-bit digital sample is a serial-bit sample and wherein said means for applying said N-bit multi-bit digital sample to the second input terminal of said adder includes a serial-bit shift register having an input terminal coupled to said input terminal for applying said multi-bit digital sample, and having an output terminal coupled to the second input terminal of said adder.

4. The apparatus set forth in claim 3 wherein said means for providing said L-LSB's includes:
   gating means having an input terminal coupled to the output terminal of said serial-bit shift register, having an output terminal coupled to said first input terminal of said adder, and having a control input terminal; and
   means coupled to said control input terminal for enabling said gating means to pass the first L-bits of said N-bit sample and for disabling said gating means during the occurrence of the (N−L)-MSB's of said N-bit sample.

5. The apparatus set forth in claim 3 wherein said means for applying said N-bit multi-bit digital sample to the second input terminal of said adder further includes means coupled in series with the output of said shift register for replicating a sign bit of said digital sample.

6. The apparatus set forth in claim 3 wherein said serial shift register includes (N−L) parallel output terminals for providing said (N−L)-MSB's and said means for applying said (N−L)-MSB's to the multiplier input terminal includes a parallel bit latch circuit coupled between said (N−L) parallel output terminals and said multiplier input terminal.

7. Apparatus for producing an estimate of the square of a number represented by a multi-bit digital sample, wherein said multi-bit digital sample comprises N-bits including L least significant bits (LSB's) and (N−L) most significant bits (MSB's) where N and L are integers, said apparatus comprising:
   an input terminal for receiving said multi-bit digital sample;
   a multiplier circuit having multiplier and multiplicand input terminals, and having an output terminal for providing said estimate;
   means coupled to said input terminal for applying said (N−L)-MSB's to said multiplier input terminal;
   means coupled to said input terminal for providing said (N−L)-MSB's of said multi-bit digital sample;
   a subtractor circuit having a subtrahend input terminal coupled to said means for providing said (N−L)-MSB's, having a minuend input terminal, and having an output terminal coupled to said multiplicand input terminal; and
   means, coupled to said input terminal, for applying said N-bit multi-bit digital sample to the minuend input terminal.

8. The apparatus set forth in claim 7 wherein said multi-bit digital sample is a serial-bit sample and said means for applying said N-bit multi-bit digital sample to said minuend input terminal comprises:
- a serial shift register having an input coupled to said input terminal and having an ouput terminal; and
- a one sample bit delay element coupled between said shift register and said minuend input terminal, said delay element effecting a multiplication by two of said N-bit digital samples.

9. The apparatus set forth in claim 8 wherein the means for providing said (N−L)-MSB's comprises:
- gating means having an input terminal coupled to the output terminal of said shift register, an output terminal coupled to said subtrahend input terminal, and having a control input terminal; and
- means coupled to said control input terminal for disabling said gating means during occurrence of said L-LSB's and conditioning said gating means to pass said (N−L)-MSB's upon their occurrence.

10. The apparatus set forth in claim 8 wherein said serial shift register includes (N−L) parallel output terminals for providing said (N−L)-MSB's and said means for applying said (N−L)-MSB's to the multiplier input terminal includes a parallel bit latch circuit coupled between said (N−L) parallel output terminals and said multiplier input terminal.

11. Apparatus for producing an estimate of the square of a number represented by a multi-bit digital serial-bit sample wherein said multi-bit digital sample comprises N-bits representing value $(A+B)$ including L least significant bits (LSB's) representing value B and $(N-L)$ most significant bits (MSB's) representing value A where N and L are intergers, said apparatus comprising:
- an input terminal for receiving said multi-bit digital sample;
- a multiplier circuit having a parallel-bit multiplier input terminal and a serial multiplicand input terminal, and having an output terminal for providing said estimate;
- a serial shift register having an input coupled to said input terminal for receiving said multi-bit digital sample, having a serial output terminal, and having $(N-L)$ parallel output terminals for providing said $(N-L)$-MSB's;
- means for coupling said $(N-L)$ parallel output terminals to said parallel-bit multiplier input terminal;
- means for coupling said serial output terminal to said serial multiplicand input terminal including means for adding said L-LSB's of said N-bit sample to said N-bit sample to develop a multiplicand input sample equal to $(A+2B)$ and the estimate of the square corresponds to $A^2+2AB$.

* * * * *